Patented Oct. 15, 1935

2,017,711

UNITED STATES PATENT OFFICE 2,017,711

FERTILIZER

John Seddoni Demontis, Bridgeport, Conn.

No Drawing. Application August 1, 1934,
Serial No. 737,925

2 Claims. (Cl. 71—9)

The present invention relates to an improved fertilizer particularly intended for fertilizing sand such as is ordinarily found at the seashore, and which is sterile insofar as its capability of growing vegetables, flowers and grass is concerned. It has been necessary heretofore where it was desired to grow anything in such sandy areas to lay about 6 inches or more of top soil upon the sand, which was both expensive and inconvenient. It is an object of my invention to provide a fertilizer in the form of a liquid compound which may be economically manufactured, and easily applied to the sand, and which when combined with the sand renders the same highly fertile. It has been found that ordinary seashore sand treated in accordance with my invention will support a rapid and abundant growth from seeds of grass, flowers, grain and all of the common vegetables, such as corn, tomatoes, beans, potatoes, melons, etc., whereas the same seeds planted in the same sand, but not treated, are entirely unproductive.

The fertilizer, according to my invention, is a liquid compound consisting of a mixture of hydrochloric acid, vinegar, ordinary wheat flour, and water, these ingredients being thoroughly mixed in substantially the following proportions, the amount given being sufficient to produce approximately 5¾ gallons, sufficient to treat 2500 square feet of ground:—

| | |
|---|---|
| Hydrochloric acid | 1 quart—or 1 part |
| Vinegar | 3 gallons—or 12 parts |
| Flour | 2 pounds—or 2 parts |
| Water | 2 gallons—or 8 parts |

The hydrochloric acid has the property of penetrating the sand not only exteriorly, but of penetrating to the kernel of the sand grains, so that the constituents of the sand are liberated or broken down to combine with the constituents of the fertilizer to actively support plant life. The vinegar contains alcohol and reduces the burning effect of the hydrochloric acid without reducing its fertilizing qualities. Flour which in its ordinary uncombined state contains starch, gluten, water, fat, and ash, mixes with the sand through the action of the acid and with it supplies the necessary elements for supporting plant life.

In the use of the fertilizer it is applied to the sand as by means of an ordinary sprinkling can, and the ground is allowed to stand for about thirty-six hours before seeds are planted therein. This permits the fertilizer to combine with the sand and allows the acid to become sufficiently inactive so that it will not burn the seeds.

It has been found that in approximately one month the following vegetables with seeds planted as above described had grown as follows:

| | Inches |
|---|---|
| Corn | 27 |
| Potatoes | 14 (with flower) |
| Wheat | 18 (mature) |
| Beans | 15 (with blossom) |
| Tomatoes | 20 (with blossom) |
| Cucumber | 9 (with blossom) |
| Melons | 11 |
| Avena | 11 (mature) |
| Biava | 11 (mature) |

The foregoing description is merely illustrative of the invention and it is not to be construed as limiting the scope thereof beyond that defined by the appended claims.

Having thus described my invention, what I claim and desire to secure by Letters Patent is:—

1. In a fertilizer composition, hydrochloric acid, vinegar, flour, and water.

2. A fertilizer composition containing hydrochloric acid one (1) part, vinegar twelve (12) parts, flour two (2) parts, and water eight (8) parts.

JOHN SEDDONI DEMONTIS.